United States Patent [19]

Savit et al.

[11] Patent Number: 4,707,787

[45] Date of Patent: Nov. 17, 1987

[54] BEAM-ACTIVATED COMPLEX-SOLID FORMATION UTILIZING PATTERN-INDEPENDENT, COORDINATE-SEQUENCE CONSTRUCTION

[75] Inventors: Carl H. Savit; Rhonda Boone; Mark Doyle, all of Houston, Tex.

[73] Assignee: Western Geophysical Company of America, Houston, Tex.

[21] Appl. No.: 690,219

[22] Filed: Jan. 10, 1985

[51] Int. Cl.$^4$ .................. G11C 13/00; G11C 13/04
[52] U.S. Cl. .................... 364/420; 365/120; 365/127
[58] Field of Search ............. 364/420; 365/107, 111, 365/119, 120, 127

[56] References Cited

U.S. PATENT DOCUMENTS

| | | |
|---|---|---|
| 4,078,229 | 3/1978 | Swainson et al. ............ 365/111 X |
| 4,288,861 | 9/1981 | Swainson et al. ............ 365/127 |
| 4,333,165 | 6/1982 | Swainson et al. ............ 365/127 X |
| 4,466,080 | 8/1984 | Swainson et al. ............ 365/127 X |
| 4,471,470 | 9/1984 | Swainson et al. ............ 365/127 |
| 4,575,330 | 3/1986 | Hull ............ 365/119 X |

Primary Examiner—Jerry Smith
Assistant Examiner—Charles B. Meyer
Attorney, Agent, or Firm—William A. Knox; Barry C. Kane

[57] ABSTRACT

A system and method for forming a model of an underground geological formation is disclosed wherein a quantity of non-solid material of the type which solidifies at volumetric positions impinged upon by preselected incident energy as used. Memory means are provided which have uniquely addressable location for storing data indicative of the desired and actual material states at respective volumetric positions. Means are additionally for scanning the data and sequentially directing the energy at supported, non-blocking, volumetric positions in the medium volume.

39 Claims, 11 Drawing Figures

BEAM-ACTIVATED COMPLEX-SOLID FORMATION UTILIZING PATTERN-INDEPENDENT, COORDINATE-SEQUENCE CONSTRUCTION

BACKGROUND OF THE INVENTION

1. Field of the Invention

The invention relates in general to beam-activated objectformation systems and relates in particular to novel methods and apparatus by means of which such systems may be employed for the construction of objects having complex geometrical form.

It is to be noted, however, that while the invention will be described with reference to particularized methods, embodiments and end uses, the invention is not limited to such particularizations. Those having ordinary skill in the art and access to the teachings of this specification will recognize additional implementations and utilization within the invention's scope.

2. Background Art

The composition and structure of underground geologic formations can be of enormous significance for disciplines such as natural-resource prospecting and earthquake prediction. Considerable effort is accordingly expended on the process of first obtaining and then analyzing data concerning such formations.

It is in the analysis phase of this process, however, that the format in which obtained data is presented to a human interpreter often significantly impacts the extent to which intra-data patterns can be perceived and their associated geophysical significance fully ascertained. This format dependence can be seen in the case of the three-dimensional reflective seismic survey, which is currently the principal technique for collecting data regarding the subject formations. Because the typical first-stage output of such a survey is a voluminous matrix of numerical values which in themselves are of limited comprehensibility, an attempt is usually made to convert the output into a more user-compatible form. The industry thus makes extensive use of expedients such as two-dimensional visual graphics of either hardcopy or computer-display variety. Furthermore, output visual effects of a pseudo three-dimensional nature are also currently achievable through an augmentation of the two-dimensional media by means of such additional graphical techniques as isometric contouring employing either color coding or perspective views.

Although these full two-dimensional and pseudo three-dimensional approaches are often very useful for a broad range of interpretive purposes, it has now been perceived that there are numerous instances where the availability of a true three-dimensional physical model of the subject formations would be decidedly advantageous. However, the typically-complex nature of these formations, in conjunction with the necessity for representational accuracy, renders conventional model-building techniques, which are usually manually-implemented, either physically inadequate or economically prohibitive.

An alternative technology which initially presents itself as a candidate for desired model-construction tasks is the ensemble of beam-activated object-formation techniques whose fundamental concepts are set forth in patents issued to W. K. Swainson. (See, for example, U.S. Pat. Nos. 4,041,476 and 4,238,840, as well as related U.S. Pats. Nos. 4,078,229; 4,288,861 and 4,333,165). Basically, the U.S. Pat Nos. 4,041,476 and 4,238,840 and references disclose apparatus for producing a three-dimensional model which includes a volume of liquid medium characterized by its solidification where impinged upon by intersecting energy beams of uniquely different properties.

While U.S. Pat. No. 4,041,476 (col. 12, line 10-12) and U.S. Pat. No. 4,238,840 (col. 10, line 64-66) suggest that underground geologic formations are a class of objects which can be effectively reproduced in three dimensions through the use of the disclosed system, neither reference teaches anything which, as a practical matter, would enable one to do so.

The U.S. Pat. Nos. 4,041,476 and 4,238,840 references disclosed a pattern-dependent, pattern-sequenced approach in which a reproduced surface is constructed by directly tracking the loci of points on the surface to be copied. The practical obstacles encountered in the use of such surface tracking are a consequence of the approach's failure to address three concurrent constructional requirements; namely, first, viewability of presently-constructed volume elements; second, non-blockage of subsequently-constructed volume elements; and third, element supportability.

The "viewability" requirement can best be illustrated by reference to the U.S. Pat. No. 4,041,476 reference's method, wherein an object is formed by means of constructional "writing" at a beam-illuminated intersection point located within an object-formation medium. It is apparent that a given point must be viewably accessible by the beams in order for them to intersect and the writing to be consequently effectuated.

The difficulty is in attempting to assure such viewability at all regions of a given complex surface, which can include multiple peaks and valleys, overhangs and other complex formations.

The "non-blockage" requirement, referred to earlier, is related to the "viewability" requirement in that a written point in the object-formation medium should not block the writing of a subsequent point. As it is not difficult to conceive of written blockages which no possible repositioning of write beams could circumvent, the rotating surface-tracking approach disclosed in the two references does not solve this second of the complex-modeling requirements.

The third requirement of surface-element supportability concerns the practical necessity for assuring that a given written element be provided with some form of structural support. While the sequential element-to-element progression which characterizes the aforementioned references' surface-tracking technique tends to assure that each written point of a simple surface will be supported by virtue of being contiguously disposed to the most-recent previously-written element, such is not the case with the modeling of complex surface formations wherein, for example, the tip of an overhang might be encountered prior to its supporting portion. Further, the unresolved problems of viewability-obstruction and subsequent-element blockage can prevent significant portions of the desired model from being sequentially constructed.

It thus becomes apparent that although the references' general suggestions envisions complex surface modeling, they contain nothing which points the way toward the construction of complex objects such as true three-dimensional representations of underground geologic formations.

SUMMARY OF THE INVENTION

The present invention generally provides a method and apparatus for a beam-activated object-formation system in which constructional writing is performed on a co-ordinate-sequenced instead of surface-sequenced basis. The invention accordingly includes the establishment of both an object-formation volume and an associated coordinate system referenced to elemental units of this volume (voxels). The desired object is specified in terms of a provided pattern and is referenced to the voxels. Object formation is then effectuated by coordinately sequencing through the volume and constructionally writing at sequence-encountered, voxels which are pattern specified; i.e., specified as containing pattern elements to be written. A method-associated end product is thereby formed as a further-provided aspect of the present invention.

One aspect of the invention provides that the co-ordinate sequencing generally proceeds from a core region of the volume to a construct-encompassing peripheral region. The sequencing progression may be advantageously performed in terms of the successive generally parallel layers, radii and ordinal angles of a cylindrical coordinate system which the invention also provides.

Another aspect of the invention provides that the medium volume be augmented with construction-support mechanisms such as volume-defining wall members and a volume-penetrating anchor. With respect to such support mechanisms, constructional writing may be restricted to specified volume elements which are supportedly disposed contiguous to either one of the support mechanism or a previously-written element.

A third aspect of the inventions pertains to the constructional writing of only the outer surface of the model. By eliminating the time required to write at interior voxels, a model is constructed more quickly. If desired, the non-solid medium contained within the written surfaces may be drained from the volume and replaced with quick-setting filler.

A fourth aspect of the invention provides drain means for the unsolidified medium, within the written surface, in the form of a tubular volume-penetrating anchor which extends through the written surface and acts as a spout after model formation.

A fifth aspect of the invention pertains to the augmentation of the co-ordinate sequencing procedure by identifying voxels which have been previously written and voxels which are supportable.

A resequencing feature is configured to interrupt the coordinate sequencing process and return to previously-sequenced voxels which are pattern-specified and presently supported but which were not previously written because of not having been supported at the time of the previous sequencing. The writing of a voxel caues the contiguous voxels to be identified as supportable.

For the particularized context of complex-object modeling, the core-to-peripheral sequencing and construction-support features of the invention sequentially enable the provided beamactivated construction technique to be one in which present viewability is maximized, subsequent blockage minimized and structural supportability provided.

DETAILED DESCRIPTION OF THE INVENTION

Figures 1, 2:
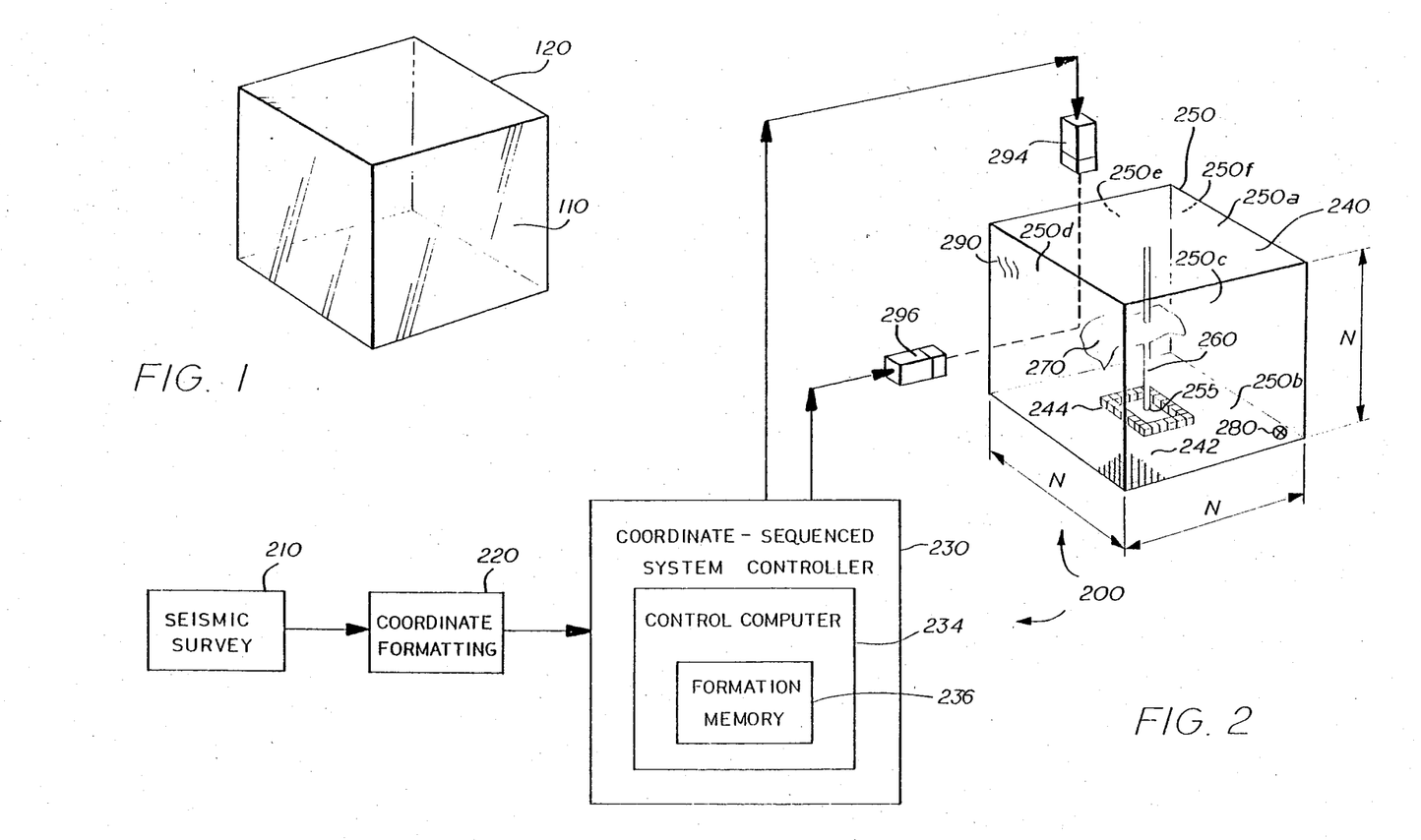
FIG. 1 is a cubic terrestrial section of an example underground geologic formation, the construction of a three-dimensional model of which is one purpose of the present invention.
FIG. 2 is schematic illustration of a beam-activated object-formation system which in accordance with the co-ordinatesequencing principles of the present invention has been configured to generate a three-dimensional model of the geologic formation of FIG. 1.

In FIG. 1, an underground geologic formation 110, encompassed within exemplary cubic terrestrial section 120, is shown. FIG. 2 schematically illustrates a beam-activated object-formation system 200 for generating within object-formation volume 240 a three-dimensional model representative of the complex formation of interest 110.

System 200 comprises a volume 240 of object-formation medium 290. Activationably communicating with the formation medium in the system is a beamed-energy apparatus in the form of first and second directed-beam sources 294 and 296, conveniently lasers having respectively different central wavelengths. The system also includes controller 230 for appropriately controlling the object-formation action of the beamed-energy sources 294,296.

The system 200 further includes both a suitable input stage 210 for generating object-specification data and an intermediate stage 220 for converting the data into controller-compatible format.

Figure 3:
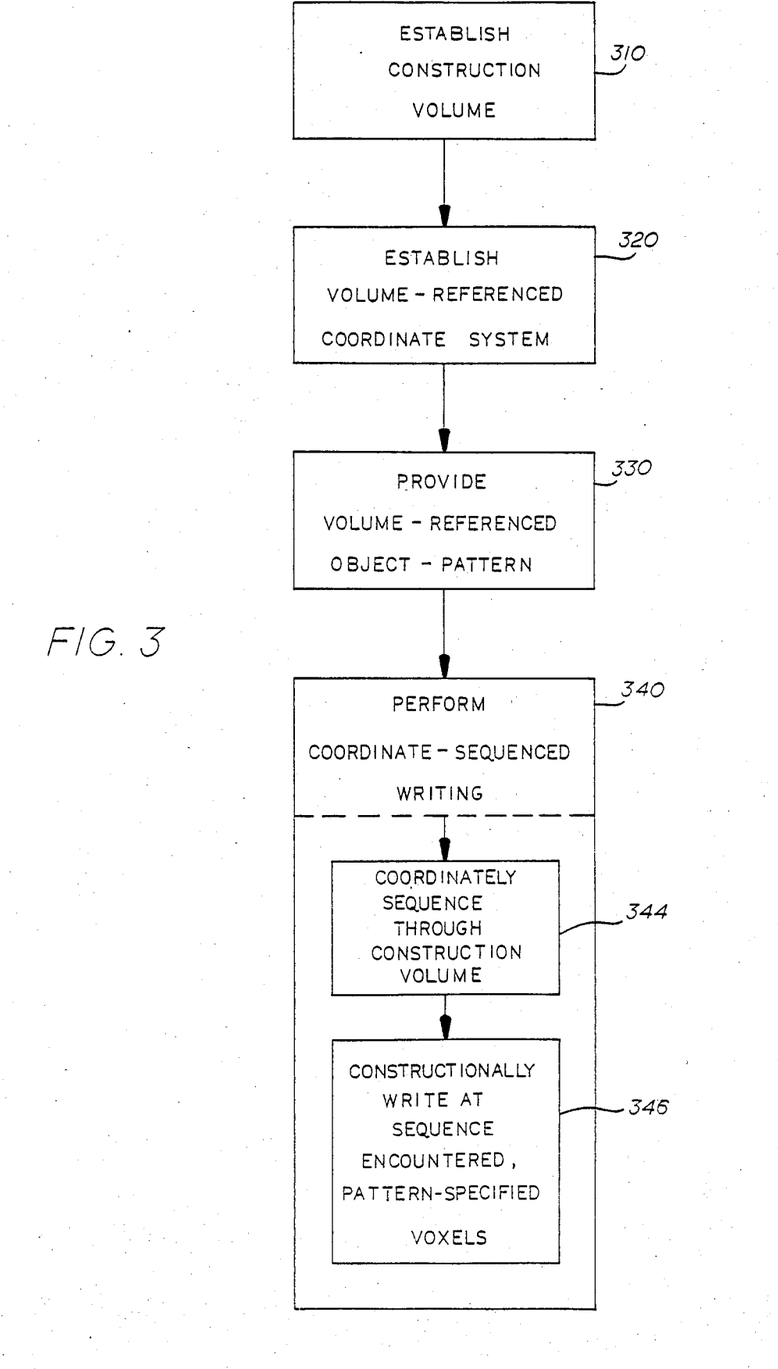
FIG. 3 is a flowchart of the basic co-ordinate-sequenced construction method of the present invention.

The operation of the system 200 is generally depicted in FIG. 3. The process begins at stage 310 with the establishment of an object-formation volume within which the surface of interest is to be constructed.

In the second stage 320,(FIG. 3) a suitable co-ordinate system is established to effectively subdivide the volume 240 into a plurality of unique, locationally-identifiable volume elements 242 (FIG. 2). By analogy to the denomination of picture elements of a visual display as "pixels", the resulting volume elements are conveniently labeled "voxels".

The next stage 330 (FIG. 3) encompasses the provision of an object-specification pattern which in effect, identifies those voxels which are to be occupied by the constructed surface. The pattern is appropriately formatted in terms of the co-ordinate system which was established in stage 320 so that the appropriate voxels may be addressed for constructive writing, as subsequently explained.

Object-formation itself then occurs at stage 340. This is performed in a one-step or multi-step manner. In the single-step process, the volume is scanned in a co-ordinate-sequenced manner; i.e., by systematically addressing the co-ordinates of the established reference frame. Such a progression is, in its basic form, essentially independent of surface shape. However, as will be explained in detail below, system 200 departs from the systematic addressing of contiguous voxels to avoid the writing of blocking and non-supported voxels. Accordingly, in an alternative multi-step process, a plurality of scan patterns may be tried before the surface can be successfully reconstructed.

The writing process is finally completed at stage 346 with the actual execution of a constructional writing at those pattern-specified voxels in the sequence in which they are encountered in the course of successful co-ordinate sequencing. Of course, stages 344 and 346 may be concurrently excecuted in the single-step process.

1. The Basis Coordinate Sequencing Scheme

The described system is configured to reproduce complex surfaces because it substantially reduces the possibility that earlier written voxels will block the beams from reaching voxels which are to be written later in the scanning process. To reduce the encountering of blocking or non-supported voxels during the sequencing through voxel addresses, the sequencing is preferably carried out in accordance with a "core-to-peripheral" philosophy. Since the volume-penetrating write beams preferably originate from directed-beam sources positioned exterior to the construction volume, viewability tends to be maximized, and blockage correspondingly minimized, when object segments located at more-interior regions of the construction volume are written before those located at more-exterior regions. Instances are accordingly minimized wherein prior-written, but peripherally-positioned, segments block beam accessibility to voxels which are pattern-specified but positioned at less-accessible interior locations.

The foregoing philosophy is implemented by defining a volumetrically-innermost area from, and around, which the constructed object will grow by accretion. Naturally, the innermost region need not necessarily coincide with either the physical center of the object as finally formed or the physical center of the overall construction volume.

The implementation of the basic sequencing process is performed by configuring controller 230 such that coordinate sequencing generally proceeds from the now-established core region to a relatively surrounding peripheral region.

2. The Coordinate System

A further degree of performance improvement may be achieved by utilizing a co-ordinate system which has been specially tailored to enhance the effectiveness of the core-to-periphery construction process. The basic features of the preferred coordinate system are schematically illustrated with respect to a volume 440 in the side view of FIGS. 4a and the top view of FIG. 4b, as a volumetrically-rectangulated cylindrical coordinate system by virtue of the manner in which it effectively applies rectangulated cylindrical indexing to a volumetrically-aligned array of substantially equal, mutually-contiguous cubic voxels.

Figure 4A:
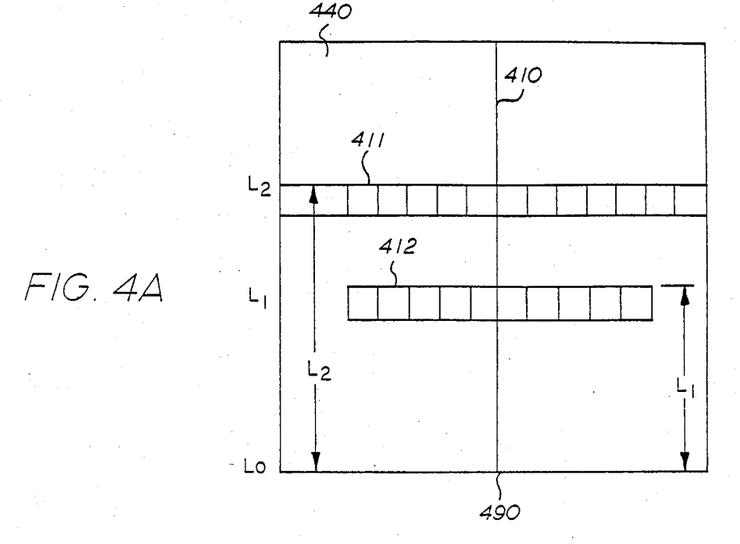
FIG. 4a and 4b schematically illustrate the angles, radii and layers of a cylindrical co-ordinate system utilizable in the practice of the present invention.

This unique co-ordinate system accordingly includes a cylindrical axis 410 which is positioned at a predetermined location within the volume 440. Axis 410 is circumscribed by a plurality of parallel, volumetrically-contiguous voxel layers as will be explained. Each voxel may be identified by an address in the form of "L, R, A". The "L" address identifies the level of thé voxel in the volume. As shown in FIG. 4a, voxel layer 411, is located at address $L_2$ while voxel layer 412 occupies sites at $L_1$ addresses.

Figure 4B:
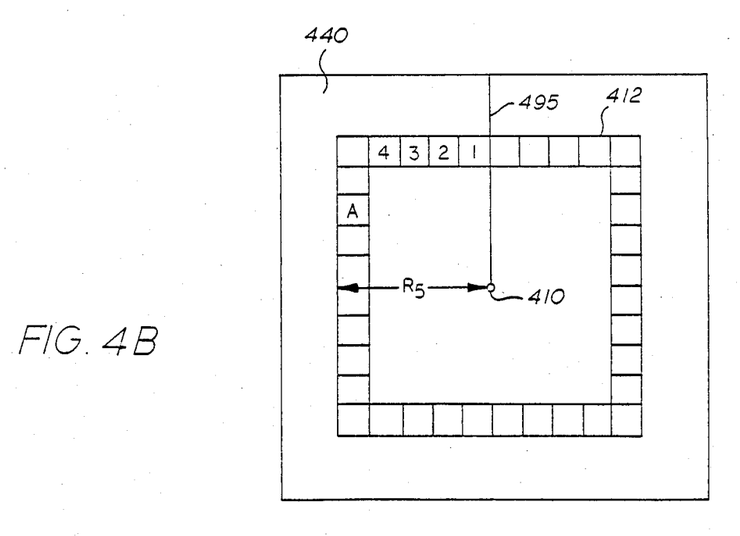

The "R" address of the voxels is illustrated by reference to voxel layer 412. The locus 412, shown as having $L_1$ addresses, is seen in FIG. 4b, as being at a "radial" distance $R_5$, from the axis; the "radial" distance is here defined as the larger of the two projections of the horizontal radius vector to the addressed voxel from the axis 410 upon the sides of the volume 240 considered as a cube and is conveniently measured in voxel units.

As may thus be seen from example locus 412, each of the coordinate system's constant R loci comprises a rectangulated, perimeteral succession of contiguous voxels. Each voxel within the locus is assigned an angular index "A" indicative of its position within the perimeteral succession. These angular indexes may effectively be "measured" from a predetermined reference ray, which in the example depicted in FIG. 4b is ray 495.

Returning to FIG. 2, controller is accordingly configured to establish a volumetrically-rectangulated cylindrical co-ordinate system, such as that described above, with respect to volume 240. Locus 244 within volume 240 schematically represents one of the resulting voxel loci for a constant R coordinate.

In the "core-to-periphery" constructional sequencing method the controller 230 may be further configured to initiate coordinate sequencing at the chosen zero-layer, zero-radius origin (i.e., at address 0, 0, 0) and to proceed on a generally successive radius-by-radius basis. At each radius, the voxels of the bottom-most level are addressed on an angle index-by-angle index basis successively begining with index one until all angular indexes have been addressed. The level address, L, is then incremented by one and the angular sequencing repeated. When the topmost level is completed, the bottom-most level is returned to and radius incremented.

The core-to-periphery, cylindrically-successive progression tends to minimize problems relating to blockage by pre-written voxels, since segments interior from the sources 294,296 tend to be written first, thus again tending to avoid situations in which the prior writing of closer segments blocks the attempted subsequent writing of more-distant segments.

B. Structural Support

The third of the previously-discussed complex-construction requirements was that the written voxels posses some form of structural support. Support may be provided by the walls 250 of the volume. Additionally, support means 255 may be imbedded in the volume, preferably along the reference axis of the coordinate system. In system 200 this anchor member advantageously takes the specific illustrated form of rod 260. It is necessary that support be composed of material that chemically or physically adhere to the formed voxels. A simple solution to this problem is to supply supports of the same composition as that of the solidified voxels, i.e., of the material produced from the medium 290 by action of laser beams produced by sources 294,296. Unique supports, appropriate to the particular object being modelled, may be designed and constructed immediately prior to actual model construction. Object segment 270 which in its illustrated condition is not yet supportedly contiguous to any of the peripheral-surface members is nevertheless supportedly stabilized by virtue of rod 260's volume-interior disposition. Accordingly, anchor rod 260 effectively provides not only construct-initiation support but also a means by which a newly-forming solid may be restrained from movement while solidification is taking place.

Superimposed on the generally followed scan pattern is the added stipulation that constructional writing be restricted to substantially only those sequence-encountered, pattern-specified voxels which are structurally supportable. Such support is a result of either being disposed volumetrically contiguous to a determinable one of either the support means 250 walls, the support means 255, or a previously-written voxel. Means are accordingly provided to identify supportable voxels so that non-blocking, supportable surface elements are written. If the walls are to be used as support means they must be of a material to which the formed solid voxels adhere but they must be transparent to the activating laser beams.

It should be recognized that there may be instances where a present writing could be effectuated and support ultimately assured, despite the fact that there is no present support for the voxel in question. For example, the viscosity properties of a given formation medium can be such as to effectively provide sufficient temporary support, enabling a subject written voxel to remain essentially suspended at a given location in the formation volume until joined by subsequently-constructed object segments.

It is possible that pattern specified voxels will not be written when sequence-encountered because they presently lack support; e.g., voxels at the tip of an overhanging hooked formation. A supported writing at a given voxel effectively creates support for voxels in volumetrically-adjacent co-ordinate positions. Because some of these adjacent voxels may have been previously sequenced but not written by virtue of not having been supported at the time of the previous sequencing, a supported writing creates the possibility that additional segments of the given object could be constructed by returning for constructional writing to such newly-supportable, previously-sequenced voxels. A more specific aspect of the invention thus includes a rescanning to pick up previously scanned but unwritten voxels. Accordingly, controller 230 is preferably configured such that the basic co-ordinate sequencing includes provisions for returning for constructional writing to previously-sequenced voxels which are both pattern-specified and presently supported but which were not previously written because of not having been supported at the time of the previous sequencing. In a preferred practice and configuration of the invention, the co-ordinate sequencing which then follows such "returned writing" can begin not at the voxel from which sequencing was diverted, but rather at the rescanned, newly-supported voxel itself.

With special regard to both the preferred cylindrical coordinate system and the preferred rescan sequence it may be noted that because several previously-scanned voxels are typically contiguous to a given presently-written voxel, the issue can arise as to which of these contiguous voxels is to be first chosen for resequencing in the event that two or more satisfy the given resequencing criteria. As will become further apparent from the software flowcharts and program listings subsequently presented, priorities in a preferred practice of the invention are set in accordance with an "opportunity-maximization" standard in which the sequencing returns to that voxel which in general will result in the greatest number of previously-scanned voxels being sequenced through again. For example, in the preferred cylindrical system, three previously-scanned voxels will be contiguous to a given general voxel: first, the same-layer, same angular index, previous-radius voxel (inner-square); second, the same-radius, same angular index, previous-layer voxel (subjacent); and third, the same-layer, same-radius, previousangle voxel. In view of the preferred sequencing procedure in which for each radius, all levels are scanned, and for each level all angles are scanned, the order in which the three previous voxels have just been here listed is also an ordinal ranking of the relative number of previous-scanned voxels available in a return to that voxel. The listed order accordingly becomes the general priority hierarchy in which the contiguous voxels are rescanned. It may be noted for the sake of completeness that the procedure is slightly different for corner voxels. Because these voxels do not, strictly speaking, possess the first type of previous contiguous voxel, the rescan at the corners is performed only with respect to the second and third voxel types. As a final related parenthetical note with regard to the corner voxels, it may be observed that while each of the other voxels in a given square possesses only one contiguous, same-level, exterior-square voxel, the corner voxels possess two such exterior, and non-diagonal, contiguities.

The time required for the object-construction process can be significantly reduced by restricting constructional writing to a thin shell which defines the subject surface. If required for support, strength, or rigidity, interior bracing may be provided by including such bracing in the constructional sequence. Toward this end, only the medium at surface-defining voxels is solidified, with remnant unsolidified medium being drained from the volume following the completion of the subject sequencing and solidification. Accordingly, the system 200 includes a drain mechanism for such purposes in the form of tubular anchor 260, the inner channel of which communicates with the non-solidified medium under the reproduced surface.

C. Controller Formatting

To identify non-blocking supportable voxels, a write-control field is established. Basically, the co-ordinate address of each voxel is linked to data bits which include first a status flag W indicative of whether the associated voxel is pattern-designated for writing. Each of the locations also include a second status flag SP indicative of whether the associated voxel is structurally supportable by being disposed volumetrically contiguous to a determinable one of either a support mechanism or a previously-written voxel. Finally, each location is provided with a third status flag PW indicative of whether the medium occupying the voxel has been previously written.

The system's beamed-energy apparatus writes at substantially only those locations which are both pattern-designated (i.e., W=1) and supported (i.e., SP=1). When a voxel is written, the support (SP) flags of volumetrically-contiguous voxels are set to "1", its PW (previously written) flag is set to "1". To effectuate resequencing, so that previously encountered but the-nunsupported voxels can be written if now supported, the PW flags of the voxels are utilized. Specifically, previously-sequenced locations are returned to if they are both pattern-specified (W=1) and presently supported (SP=1) but which were not previously written (PW=0) because of not having been supported at the time of said previous sequencing. Sequence-encountered locations which are in previously-written status can be by-passed.

D. Computer Software Routine

1. Program Flowcharts

Figure 5:
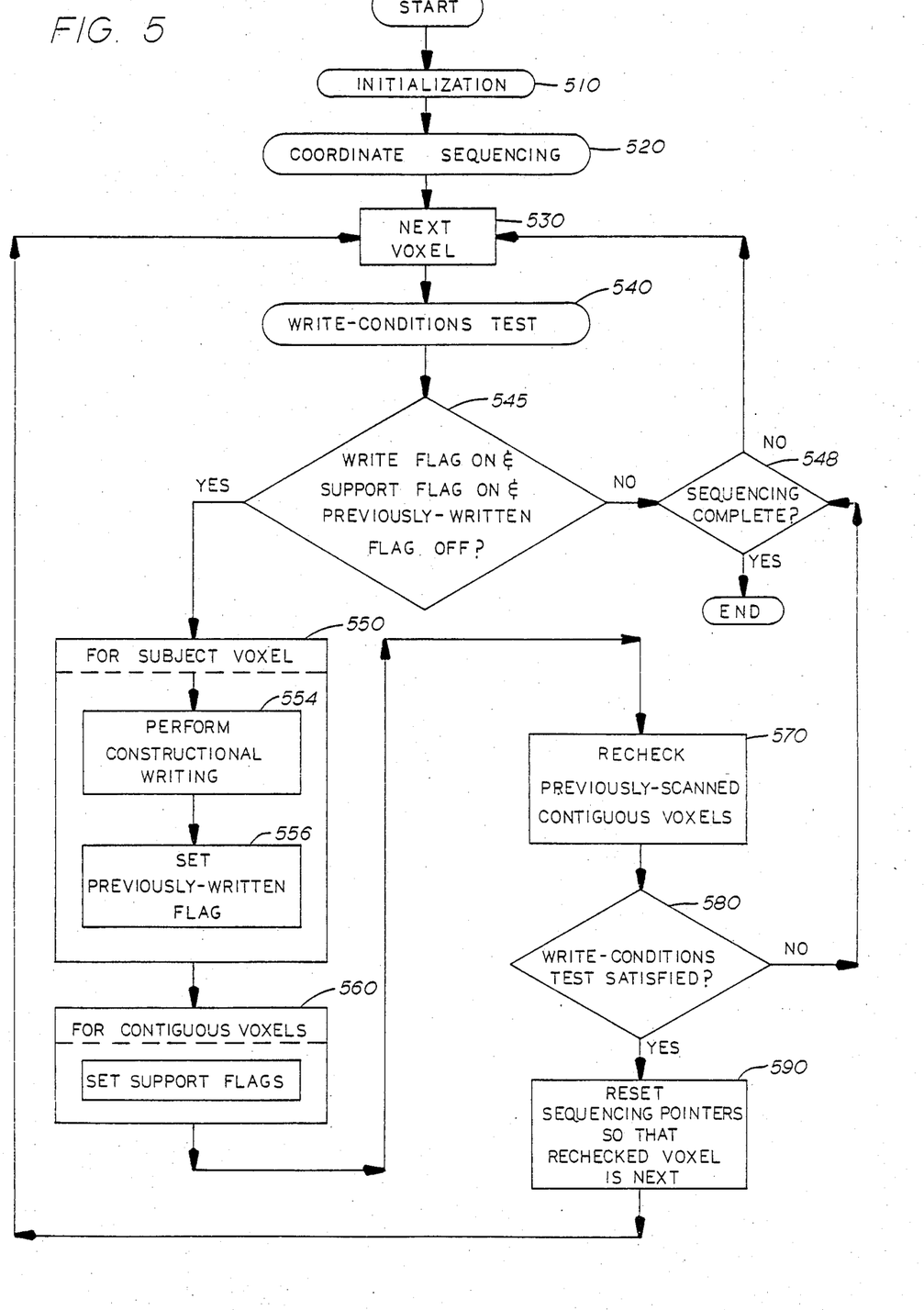
FIG. 5 is an overview flowchart of a procedure by means of which important aspects of the construction method of FIG. 3 may be implemented.
Figure 6:
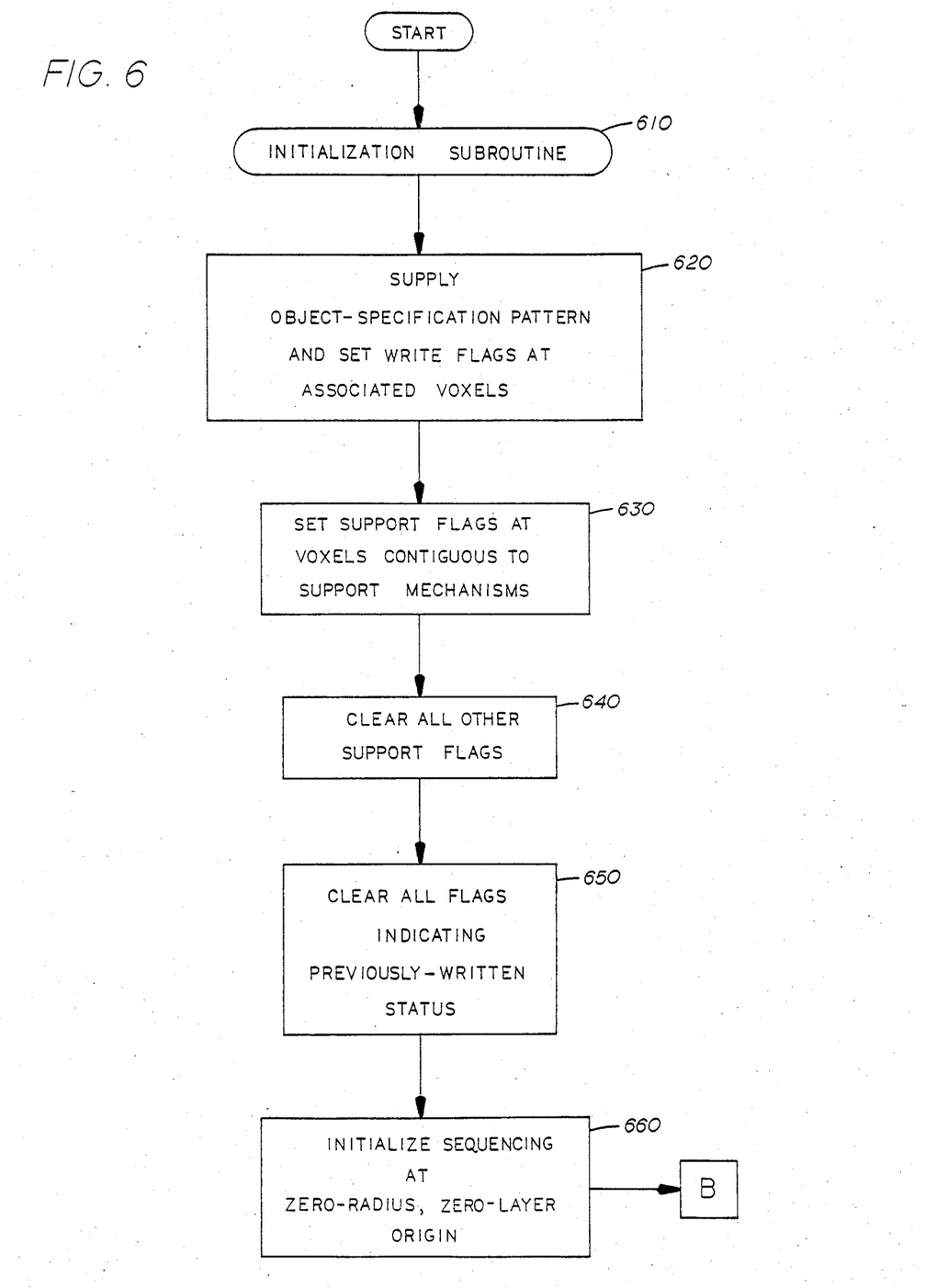
FIG. 6 through 10 present a detailed expansion of the flowchart of FIG. 5.
Figure 7:
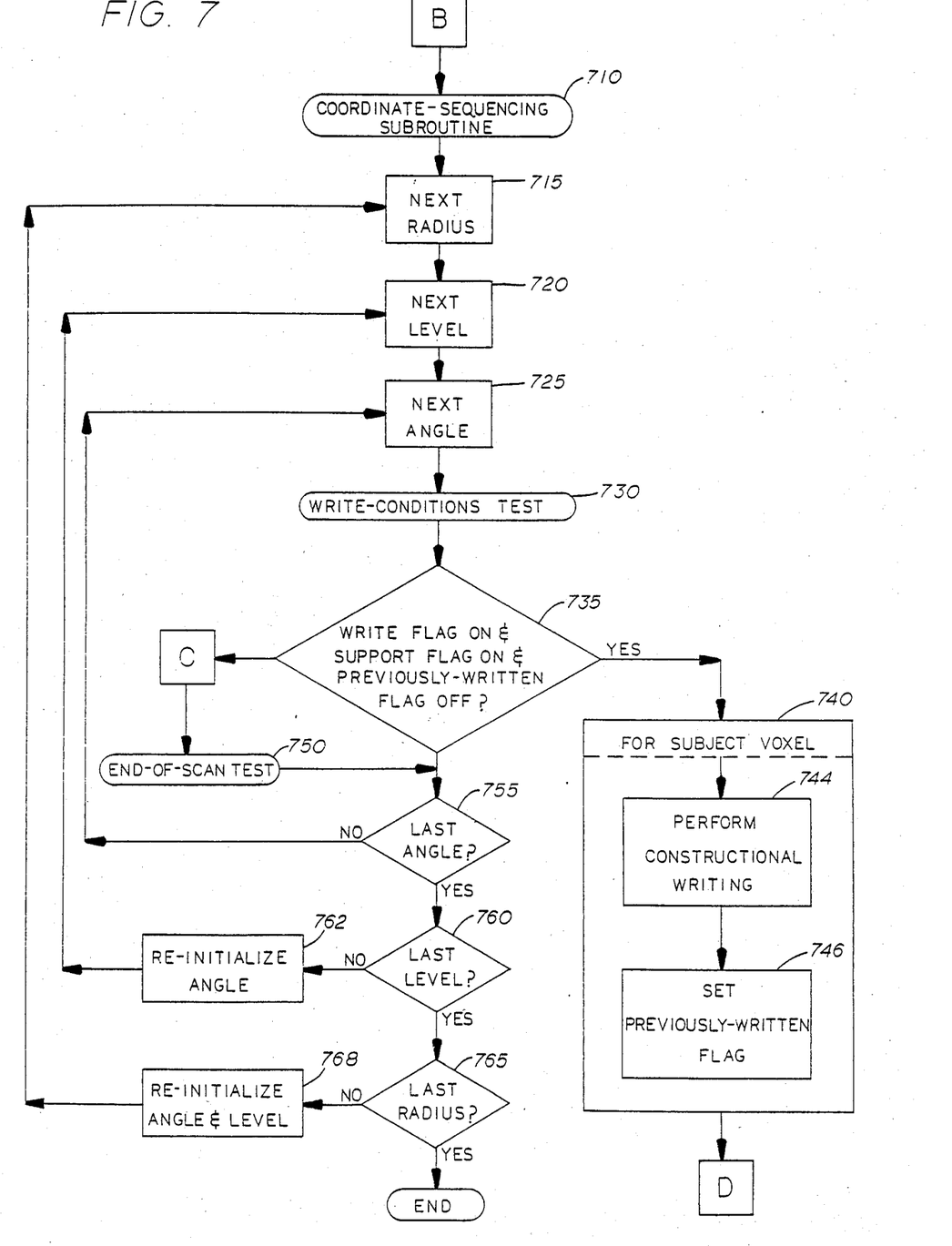
Figure 8:
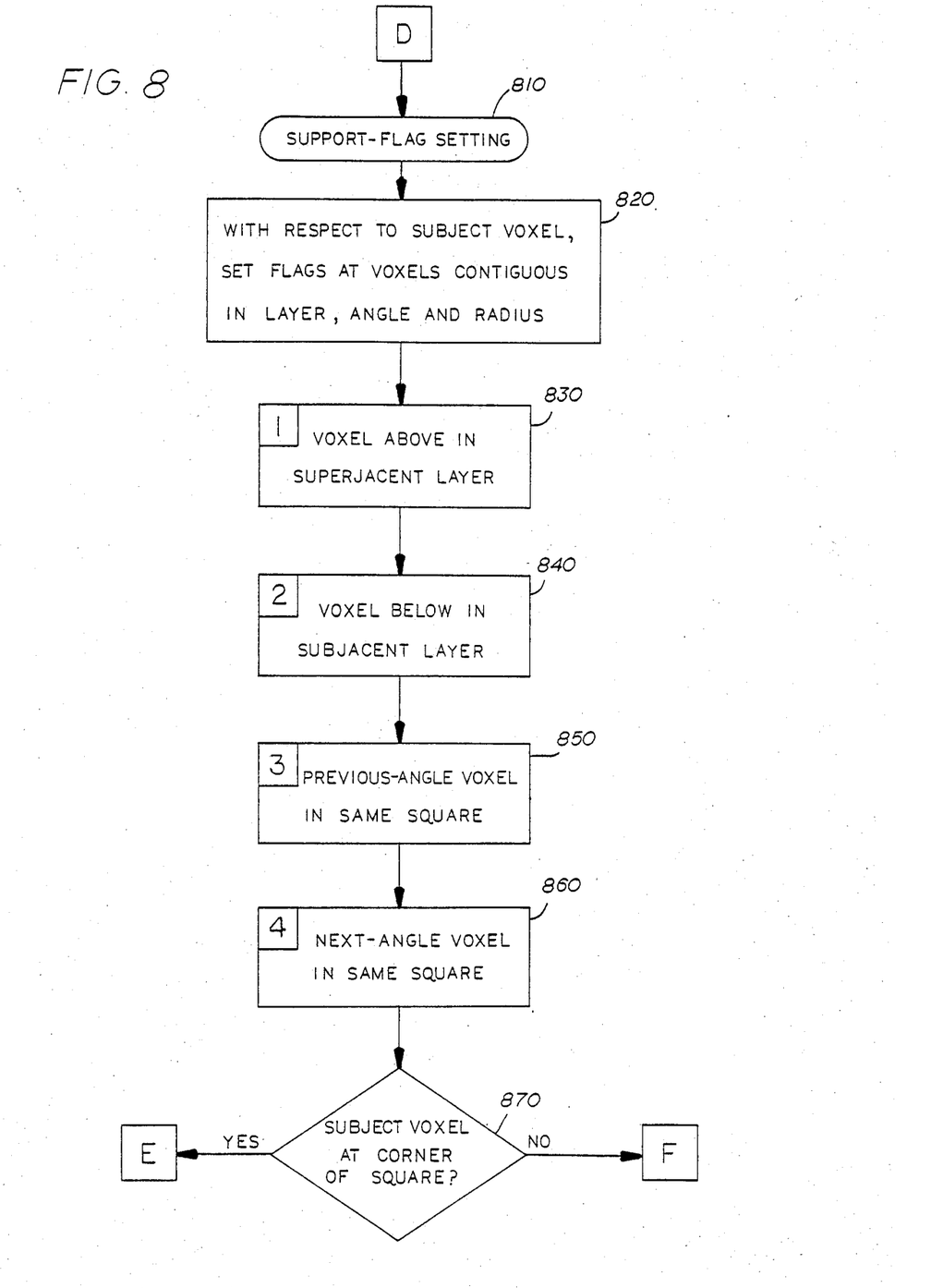
Figure 9:
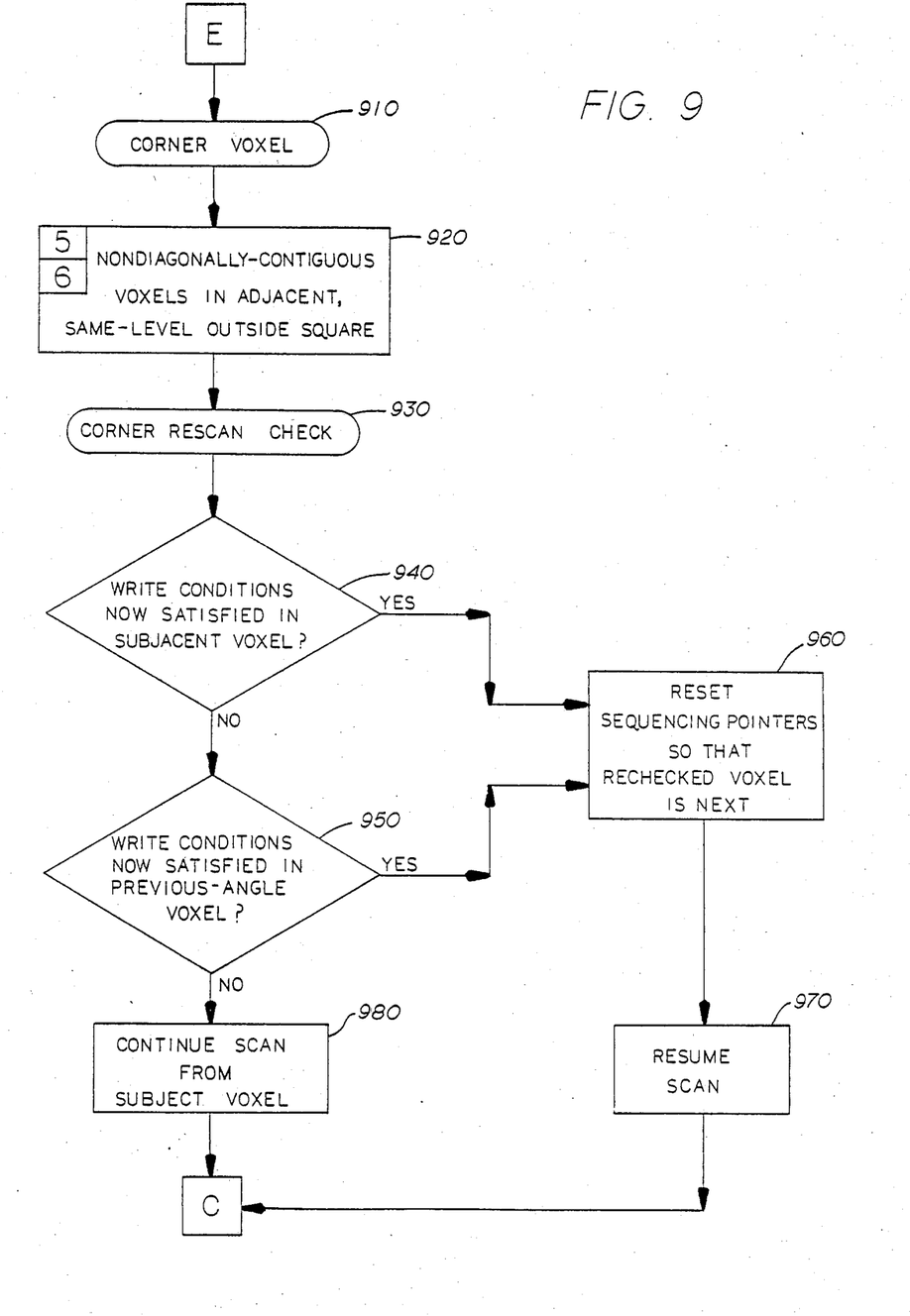
Figure 10:
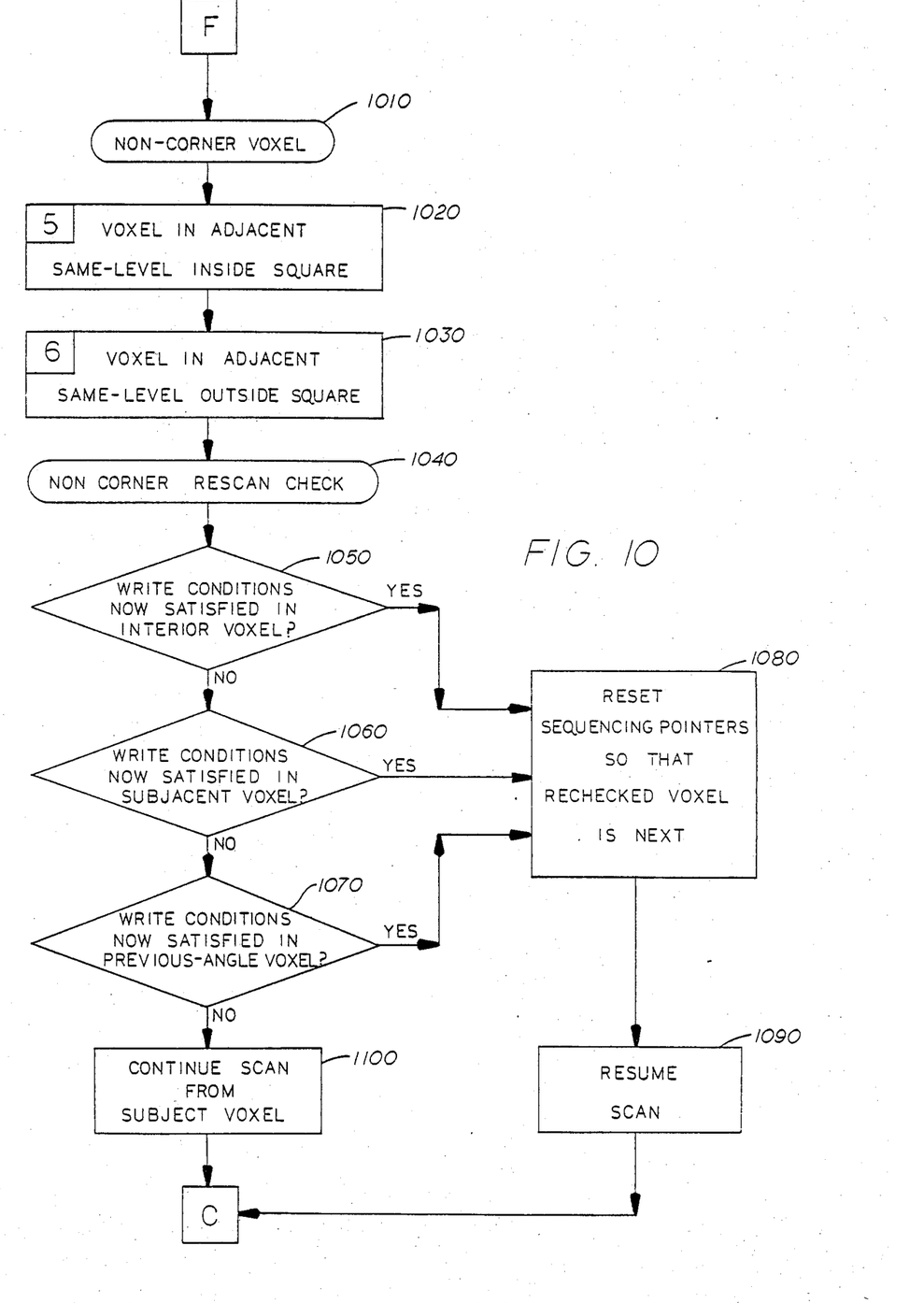

A computer software routine by means of which a computerized system controller could be configured to implement major aspects of a preferred version of the invention is presented first in overview form in FIG. 5, then in expanded form in FIGS. 6 through 10, and finally in terms of a program in a language quite similar to PL/1, listed below. It will become apparent that the subject flowcharts, especially when considered in conjunction with the foregoing detailed discussion and the following program listing, are largely self-explanatory.

2. Program Listing

A program listing for carrying out the object formation process described herein is found in the patented file as Attachment A, and is incorporated by reference.

While the preceding description was based on an assumed cubical configuration of both the enclosing volume 240 and the individual voxels, it may be equally convenient to operate with a cylindrical volume 240 and voxels that are of wedge, disk, or other naturally formed shapes. The programming sequence for construction may then be based on conventional cylindrical coordinates or any of seversl co-ordinates systems that will suggest themselves to the skilled artesian. The natural relationship of the construction sequence procedures to those applicable to such other co-ordinate systems will similarly be readily apparent to the skilled artesian having the benefit of these teachings and, for brevity, will not be addressed in further detail.

The preceding description has presented, in detail, exemplary preferred ways in which the concepts of the present invention may be applied. Those skilled in the art will recognize that numerous alternatives encompassing many variations may readily be employed without departing from the spirit and scope of the invention as set forth in the appended claims.

We claim:

1. A system for forming a model of an underground geological formation, comprising:
   (A) container means for supporting a volume of non-solid material of the type which solidifies at volumetric positions impinged upon by incident energy of a pre-selected characteristic;
   (B) means for producing said energy;
   (C) memory means having uniquely addressable locations for storing data indicative of the desired and the actual material states at respective volumetric positions;
   (D) means for identifying the volumetric positions to be occupied by the modeled surface of the geological formation;
   (E) means for storing data indicative of a desired solid material state in the identified volumetric positions; and
   (F) means for scanning the data in the addressable locations of said memory means and sequentially directing said energy generally at supported non-blocking volumetric positions to solidify a shell-like layer of the non-solid material.

2. The system of claim 1 including drain means for permitting the egress from within the shell-like layer of non-solid material subsequent to formation of the shell-like layer.

3. The system of claim 1 including anchor means substantially immersed in the non-solid material for supporting the initially solidified material.

4. The system of claim 3 wherein the anchor means is a hollow member having an external suface for supporting the initially solidified material and having an internal conduit for conducting the non-solid material through the layer of solidified material subsequent to formation of the shell-like layer.

5. The system of claim 3 wherein the anchor means includes a structure adapted for separation from the shell-like layer after formation of said structure so as to leave a gap therein through which the non-solid material can drain.

6. In a beam-activated object formation system, a construction method comprising:
   (A) establishing an object-formation volume;
   (B) establishing with respect to said volume a voxel-referenced coordinate system;
   (C) providing with respect to said volume a voxel-referenced specification pattern of desired-object configuration; and
   (D) forming said object by coordinately sequencing through said volume, and constructionally writing at sequence-encountered, pattern-specified voxels.

7. A construction method according to claim 6, wherein
   said volume as coordinately established includes a construct-centralization region and a construct-encompassing peripheral region.

8. A construction method according to claim 7, wherein
   said coordinate system comprises a volumetrically-rectangulated cylindrical coordinate system having:
   (1) a predeterminately-positioned axis;
   (2) successive, generally parallel, volumetrically-contiguous voxel layers disposed generally perpendicular to said axis; and
   (3) an intra-layer succession of voxels where:
      (a) each of said voxels is assigned an address indicative of its level within the volume;
      (b) each of said voxels is assigned a radial address indicative of its distance from said axis; and
      (c) each of said voxels is assigned an angular address indicative of ordinal position about the axis.

9. A construction method according to claim 8 in which:
   with respect to the layers, radii and angles of said cylindrical coordinate system, said coordinate sequencing is initiated at the zero-layer, zero-radius origin of said system and is performed on a successive radius-by-radius basis, with the sequencing for each radius then being performed on a successive layer-by-layer basis, and with the sequencing within each radially-referenced layer in turn being performed on a successive angle-by-angle basis.

10. A construction method according to claim 9, wherein
   said formation system includes first and second directed-beam, construct-activation energy sources, said sources are configured with respect to said established volume such that the first beam penetrates said volume in general longitudinal relationship to said cylindrical axis, from a high layer-index position downward, while said second beam penetrates said volume in general transverse relationship to said axis, from a high radial-index position inward.

11. A construction method according to claim 6, wherein the step of
   establishing said volume further includes:
   (A) providing a construction support means; and (B) performing said constructional writing at substantially only those sequence-encountered, pattern-specified voxels which are structurally supported by being disposed volumetrically contiguous to a determinable one of either said support means or a previously-written voxel.

12. A construction method according to claim 11 in which said coordinate sequencing includes the step of:
returning for constructional writing to previsouly-sequenced voxels which are both pattern-specified and presently supported but which were not previously written because of not having been supported at the time of said previous sequencing.

13. A construction method according to claim 11, wherein said construction support means is penetrating said volume with anchor means.

14. The construction method of claim 13 including: penetrating the center of said volume with the anchor means.

15. A construction method according to claim 11, wherein step (B) further includes:
(A) establishing the origin of said coordinate system at a geometric center of said volume; and
(B) indicating said coordinate sequencing at said geometric origin.

16. A construction method according to claim 6, wherein step (D) further includes the steps of:
(A) solidifying generally only surface-defining, constructionally-written voxels; and
(B) after the completion of said sequencing and said solidification, draining remnant unsolidified liquid from said volume.

17. A construction method according to claim 6 further comprising
deriving said voxel-referenced specification pattern from three-dimensional seismic-survey data representative of an underground geologic formation, thereby forming a representative three-dimensional model of said formation.

18. A construction method according to claim 6 further comprising the steps of
(A) establishing a write-control field having a plurality of control locations referenced to the voxels of said volume's coordinate system, where:
(1) each of said control locations includes a status flag indicative of whether the associated voxel is pattern-designated for writing; and
(2) each of said control locations includes a status flag indicative of whether the associated voxel is structurally supported by being disposed volumetrically contiguous to a determinable one of either said support means or a previously-written voxel;
(B) supplying said specification pattern to said control field by altering to write status those control locations associated with said voxel-referenced pattern; and
(C) performing said object formation by sequencing through said control field, writing at substantially only those locations which are both pattern-designated and supported, while altering volumetrically-contiguous locations to support status following each such supported writing.

19. A consruction method according to claim 18, wherein
each of said control-field locations includes a status flag indicative of whether the subject voxel has previously been written; and
said control-field sequencing includes the steps of:
(1) altering a subject location to previously-written status following a supported writing at that location; and
(2) returning for resequencing to previously-sequenced locations which are both pattern-specified and presently supported but which wre not previously written because of not having been supported at the time of said previous sequencing.

20. In a beam-activated object-formation system, a construction method comprising:
(A) establishing an object-formation volume which includes construction-support means;
(B) establishing with respect to said volume a voxel-referenced, volumetrically-rectangulated cylindrical coordinate system having:
(1) a predeterminately-positioned axis whose voxel-referenced units index successive, parallel, volumetrically-contiguous voxel layers disposed generally perpendicular to said axis; and
(2) an intra-layer succession of voxel-referenced squared loci, disposed both mutually-parallel and mutually-concentric with respect to said axis, where:
(a) each of said loci comprises a perimeteral succession of contiguous voxels;
(b) each of said loci is assigned a radial index whose voxel-referenced units indicate its distance from said axis; and
(c) each voxel within each of said loci is assigned an angular index locationally indicative of ordinal position within the given perimeteral succession;
(C) providing with respect to said volume a voxel-referenced specification pattern of desired-object configuration; and
(D) forming said object by coordinately sequencing through said volume, contructionally writing at sequence-encountered, pattern-specified voxels, where:
(1) with respect to the layers, radii and angles of said cylindrical coordinate system, said coordinate sequencing is initiated at the zero-layer, zero-radius origin of said system and is performed on a successive radius-by-radius basis, with the sequencing for each radius then being performed on a successive layer-by-layer basis, and with the sequencing within each radially-referenced layer then in turn being performed on a successive angle-by-angle basis;
(2) said constructional writing is performed at substantially only those sequence-encountered, pattern-specified voxels which are structurally supported by being disposed volumetrically contiguous to a determinable one of either said support means or a previously-written voxel; and
(3) said coordinate sequencing includes the step of returning for resequencing to previously-sequenced voxels which are both pattern-specified and presently supported but which were not previously written because of not having been supported at the time of said previous sequencing.

21. A construction method according to claim 20 further comprising the steps of
(A) defining said volume with a plurality of wall members;

(B) designating as an origin surface a predetermined one of said wall members;
(C) establishing the origin of said coordinate system at the geometric center of said origin surface; and
(D) penetrating said volume with an anchor rod disposed at the geometric center and along the axis of said coordinate system.

22. In a beam-activated object-formation system which includes computer means configured for the control of a subject formation process, with said computer means in turn including a formation-control memory, a construction method comprising;
(A) establishing an object-formation volume which includes:
  (1) a plurality of planar, construction-support, peripheral-surface members mutually configured to contain said volume with a predetermined one of said surface members being designated as an origin plane; and
  (2) a volume-penetrating, construction-support anchor-rod disposed perpendicularly meeting the geometric center of said origin plane;
(B) establishing with respect to said volume a voxel-referenced, volumetrically-rectangulated cylindrical co-ordinate system having:
  (1) a predeterminately-oriented cylindrical axis whose voxel-referenced units index successive, parallel, volumetrically-contiguous voxel layers disposed perpendicular to said axis;
  (2) an intra-layer succession of voxel-referenced squared loci, disposed both mutually-parallel and mutually-concentric with respect to said axis, where:
    (a) each of said loci comprises a squared-perimeteral succession of contiguous voxels;
    (b) each of said loci is assigned a radial index whose voxel-referenced units indicate the minimum distance from said cylindrical axis to the outside of the given square; and
    (c) each voxel within each of said loci is assigned an angular index locationally indicative of ordinal position within the given perimeteral succession; and
  (3) a zero-layer, zero-radius origin, where said coordinate system as established is disposed both with said origin located at the geometric center of said origin plane and with said cylindrical axis coaxially aligned with said perpendicularly-disposed anchor rod;
(C) providing with respect to said volume a voxel-referenced specification pattern of desired-object configuration; and
(D) forming said object by co-ordinately sequencing through said volume, constructionally writing at sequence-encountered, pattern-specified voxels, where:
(E) with respect to the layers, radii and angles of said cylindrical coordinate system, said co-ordinate sequencing is initiated at the zero-layer, zero-radius origin of said system and is performed on a successive radius-by-radius basis, with the sequencing for each radius then being performed on a successive layer-by-layer basis, and with the sequencing within each radially-referenced layer then in turn being performed on a successive angle-by-angle basis; and where
(F) said sequenced constructional writing includes the steps of:
  (1) establishing within said formation-control memory a write-control field having control locations referenced to the voxels of said volume's coordinate system, where:
    (a) each of said locations includes a status flag indicative of whether the associated voxel is pattern-designated for writing; and
    (b) each of said locations includes a status flag indicative of whether the associated voxel is structurally supported by being disposed volumetrically contiguous to a determinable one of either said support means or a previously-written voxel;
    (c) each of said control-field locations includes a status flag indicative of whether the subject voxel has previously been written;
  (2) supplying said specification pattern to said control field by altering to write status those control locations associated with said voxel-referenced pattern; and
  (3) performing said object formation by:
    (a) sequencing through said control field, constructionally writing at substantially only those locations which are both pattern-designated and supported, where following a supported writing at any given location:
      (i) the subject location is altered to previously-written status; and
      (ii) volumetrically-contiguous locations are altered to support status;
    (b) returning for resequencing to previously-sequenced locations which are both pattern specified and presently supported but which were not previously written because of not having been supported at the time of said previous sequencing; and
    (c) by-passing those sequence-encountered locations which are in previously-written status.

23. A construction method according to claim 22, wherein
said volume contains, as an aspect of said beam-activated system, a liquid object-formation medium;
said specification pattern defines a surface; and
said method further comprises the steps of:
(A) solidifying generally only the resulting surface-defining, constructurally-written voxels; and
(B) draining remnant unsolidified liquid from said volume after the completion of said sequencing and said solidifying.

24. A construction method according to claim 22 wherein
said specification pattern is derived from threedimensional seismic-survey data representative of an underground geologic formation, with the resulting constructed object thereby comprising a representative three-dimensional model of said formation.

25. A beam-activated object-formation system comprising:
(A) means establishing an object-formation volume;
(B) a beam activated object-formation medium enclosed within said volume;
(C) beamed-energy means activationably communicating with said volume-enclosed medium; and
(D) means for the object-formation control of said energy means, where:

(1) said control means is configured to establish with respect to said volume a voxel-referenced coordinate system;

(2) said control means is adapted to receive a voxel-referenced specification pattern of desired-object configuration; and (3) said control means is configured to sequence through said co-ordinate system and cause said energy means to constructionally write at sequence-encountered, pattern-specified voxels, thereby enabling a desired object to be formed.

26. A system according to claim 25, in which;

said volume-establishment means and said coordinate establishing control means are mutually configured to in turn establish within said volume a construct-centralization region and a construct-encompassing peripheral region; and said control means is configured such that said coordinate sequencing generally proceeds from said centralization region to said peripheral region.

27. A system according to claim 26, in which:

said control means is configured such that said coordinate system is established comprises a volumetrically-rectangulated cylindrical coordinate system having:

a predeterminately-oriented cylindrical axis whose voxel-referenced units index successive, parallel, volumetrically-contiguous voxel layers disposed perpendicular to said axis; and an intra-layer succession of voxel-referenced rectangulated loci, disposed both mutually-parallel and mutually-concentric with respect to said axis, where:

(1) each of said loci comprises a rectangulated-perimeteral succession of contiguous voxels;

(2) each of said loci is assigned a radial index whose voxel-referenced units indicate the minimum distance from said cylindrical aixs to the outside of the given rectangle; and (3) each voxel within each of said loci is assigned an angular index locationally indicative of ordinal position within the given perimeteral succession.

28. A system according to claim 27, in which:

said control means is configured such that with respect to the layers, radii and angles of said cylindrical coordinate system, said coordinate sequencing is initiated at the zero-layer, zero-radius origin of said system and is performed on a successivve radius-by-radius basis, with the sequencing for each radius then being performed on a successie layer-by-layer basis, and with the sequencing within each radially-referenced layer then in turn being performed on a successive angle-by-angle basis.

29. A system according to claim 28, in which:

said beamed-energy means includes first and second directed-beam sources; and said sources are configured with respect to said established volume such that the first beam penetrates said volume in general longitudinal relationship to said cylindrical axis, from a high layer-index position downward, while said second beam penetrates said volume in general transverse relationship to said axis, from a high radial-index position inward.

30. A system according to claim 25, in which:

(A) said volume-establishment means includes construction-support means; and (B) said control means is configured such that said sequenced constructional writing is performed at substantially only those sequence-encountered, pattern-specified voxels which are structurally supported by being disposed volumetrically contiguous to a determinable one of either said support means or a previously-written voxel.

31. A system according to claim 30, in which:

said control means is configured such that said coordinate sequencing includes returning for constructional writing to previously-sequenced voxels which are both pattern-specified and presently supported but which were not previously written because of not having been supported at the time of said previous sequencing.

32. A system according to claim 30, in which:

said support means includes six planar peripheral-surface members mutually configured to enclosedly define said volume as rectangulated.

33. A system according to claim 30, in which:

said support means, including anchor means, is penetrating the volume.

34. A system according to claim 30, in which:

said support means includes a volume-defining peripheral-surface member having a geometric center; and said control means is configured such that;

(1) the origin of said coordinate system is established at said geometric center; and (2) said co-ordinate sequencing is initiated at said geometric origin.

35. A system according to claim 34, in which:

said support means includes volume-penetrating anchor means; and said anchor means is disposed within said volume and meeting said geometric origin.

36. A system according to claim 35, in which:

said anchor means comprises a straight-axised rod.

37. In an object formation system of the type in which discrete portions of an initially non-solid medium are sequentially solidified by the application of energy from a source according to a pattern to form an object, the improvement comprising:

means for sequencing said energy source through successive preselected coordinate locations and means for activating said energy source only at those locations selected by said pattern.

38. The system of claim 37 further comprising solid anchor means located in said non-solid medium, said anchor means providing support for at least those portions of the initially non-solid medium that are subsequently solidified.

39. The system of claim 37 wherein said pattern is provided by discrete seismic survey data which has been formatted in said preselected coordinates.

* * * * *